United States Patent
Skvortsov et al.

(10) Patent No.: US 7,305,323 B2
(45) Date of Patent: Dec. 4, 2007

(54) METHOD AND APPARATUS FOR COUNTING A NUMBER OF STEPS TAKEN BY WALKER

(75) Inventors: Vladimir Skvortsov, Suwon-si (KR); Ji-hyun Choi, Seoul (KR); Kun-soo Shin, Seongnam-si (KR); Hyun-tai Hwang, Pusan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 11/327,389

(22) Filed: Jan. 9, 2006

(65) Prior Publication Data
US 2006/0174685 A1 Aug. 10, 2006

(30) Foreign Application Priority Data
Feb. 4, 2005 (KR) ............... 10-2005-0010618

(51) Int. Cl.
G01C 21/00 (2006.01)
(52) U.S. Cl. ............... 702/160; 702/141; 377/24.2
(58) Field of Classification Search ............. 702/160
See application file for complete search history.

(56) References Cited

U.S. PATENT DOCUMENTS

| | | | |
|---|---|---|---|
| 4,736,312 A | 4/1988 | Dassler et al. | |
| 5,485,402 A | 1/1996 | Smith et al. | |
| 5,583,776 A | 12/1996 | Levi et al. | |
| 6,145,389 A * | 11/2000 | Ebeling et al. | ............ 73/865.4 |
| 6,546,336 B1 * | 4/2003 | Matsuoka et al. | .......... 701/213 |
| 6,611,789 B1 | 8/2003 | Darley | |
| 6,980,919 B2 * | 12/2005 | Ido | ........................ 702/150 |
| 7,200,517 B2 * | 4/2007 | Darley et al. | ............... 702/160 |

* cited by examiner

Primary Examiner—Hal Wachsman
(74) Attorney, Agent, or Firm—Sughrue Mion Pllc.

(57) ABSTRACT

A method and apparatus for counting the steps taken by a walker is provide. The method includes detecting an acceleration value generated by a step taken by a walker at every first stated interval, calculating a standard deviation of detected acceleration values at every second stated interval, determining a walking mode corresponding to the calculated standard deviation among first through $N^{th}$ walking modes as a walking pattern of the walker, in which N is a positive integer that is larger than 1, checking if there is at least one absolute value that is larger than a threshold acceleration value corresponding to the determined walking mode among the absolute values of the detected acceleration values, and incrementing a count value as a step taken by the walker if there is at least one absolute value that is larger than the threshold acceleration value among the absolute values of the detected acceleration values.

14 Claims, 2 Drawing Sheets

METHOD AND APPARATUS FOR COUNTING A NUMBER OF STEPS TAKEN BY WALKER

CROSS-REFERENCE TO RELATED PATENT APPLICATION

This application claims priority from Korean Patent Application No. 10-2005-0010618, filed on Feb. 4, 2005, in the Korean Intellectual Property Office, the disclosure of which is incorporated herein in its entirety by reference.

BACKGROUND OF THE INVENTION

1. Field of the Invention

The present invention relates to counting the number of steps taken by a walker, and more particularly, to a method and apparatus for counting the number of steps taken by a walker according to a walking pattern of the walker.

2. Description of the Related Art

An apparatus for counting the number of steps measures the number of steps taken by a walker while the walker walks or runs and a distance the walker travels. Such an apparatus counts the number of steps taken by a walker using various methods. For example, the apparatus senses an acceleration value generated by a vertical movement of the body while a walker walks and counts as one step when the acceleration value is higher than a predetermined value. As a second example, a sensor capable of sensing pressure generated by a walker's stepping is included in a walker's shoe. Thus, pressure is applied to the sensor whenever the walker takes a step and the number of steps taken by the walker is counted by calculating the number of times pressure is applied to the sensor.

Some pedometers count steps more directly by means of a sensor or sensors embedded in the shoe that are connected directly to a counter. This can be done mechanically where each step depresses a mechanism that causes a mechanical counter to increment. More frequently electrical means are used whereby an electrical switch is closed by each step, creating an electrical signal that causes an electronic counter to increment. In particular, these pedometers allow the user to change gaits while walking and running.

Another type of pedometers incorporate acceleration sensors. However, they attach to feet or shoes (U.S. Pat. No. 6,145,389), or to a walker's ankles (U.S. Pat. No. 5,485,402). In some cases, the arrangement may increase their accuracy but at cost of inconvenience in the arrangement. U.S. Pat. No. 4,736,312 discloses a device that measures the stride length of a runner by measuring the elapsed time between the time when one foot lifts off the ground and the time when the other foot hits the ground during a stride. The shoes on both feet are equipped with sensors, and the data from both must be communicated to a central processor that performs the distance calculation. Shoe sensors are impractical, since they require special shoe modifications and possibly wires up the leg of the user. Since it is comprised of three different components, a system is also more expensive than a single unit. U.S. Pat. No. 5,485,402 discloses a gait activity monitor that incorporates an accelerometer attached to the ankle of the wearer, which measure the acceleration of the ankle. A data processor processes this acceleration data, counting and recording the number of steps taken during each measurement time interval. It is not a self-contained unit that the user can portably wear. Some pedometers incorporate an accelerometer (U.S. Pat. No. 5,583,776), which is used as a more accurate alternative to the pendulum mechanism, but the system includes a foot-mounted unit, a wrist-mounted unit, and a chest-mounted unit, all attached to a user who is in locomotion. In U.S. Pat. No. 6,611,789, a "foot contact time" of a user in locomotion is measured for monitoring movement, wherein "foot contact time" refers to the period of time that a foot of a user is in contact with the surface during a stride taken by the user while the user is in locomotion on foot.

However, since conventional apparatuses for counting the number of steps do not perform step counting according to such a walking pattern of a walker as walking or running, it cannot accurately count the number of steps taken by the walker. In other words, when the predetermined value is set based on a walker's walking, the number of steps while the walker runs may be counted higher than the number of steps that are actually taken by the walker. When the predetermined value is set based on a walker's running, the number of steps when walking may be counted lower than the number of steps that are actually taken by the walker. In addition, when using the sensor capable of measuring pressure generated by a walker's stepping, other types of pressure as well as pressure applied to a sensor by a walker's stepping are regarded as being generated by a walker's stepping and thus a count value is mistakenly incremented as a step taken by the walker.

SUMMARY OF THE INVENTION

The present invention provides a method for counting the number of steps taken by a walker, in which the number of steps is counted by identifying a walking pattern of the walker based on a standard deviation of acceleration values generated by steps taken by the walker.

The present invention also provides an apparatus for counting the number of steps taken by a walker, in which the number of steps is counted by identifying a walking pattern of the walker based on a standard deviation of acceleration values.

According to an aspect of the present invention, there is provided a method for counting the number of steps taken by a walker. The method includes detecting an acceleration value generated by a step taken by a walker at every first stated interval, calculating a standard deviation of detected acceleration values at every second stated interval, determining a walking mode corresponding to the calculated standard deviation among first through $N^{th}$ walking modes as a walking pattern of the walker, in which N is a positive integer that is larger than 1, checking if there is at least one absolute value that is larger than a threshold acceleration value corresponding to the determined walking mode among the absolute values of the detected acceleration values, and incrementing a count value as a step taken by the walker if there is at least one absolute value that is larger than the threshold acceleration value among the absolute values of the detected acceleration values.

According to another aspect of the present invention, there is provided an apparatus for counting the number of steps taken by a walker. The apparatus includes an acceleration detecting unit, a standard deviation calculating unit, a walking mode analyzing unit, an acceleration comparing unit, and a step counting unit. The acceleration detecting unit detects an acceleration value generated by a step taken by a walker at every first stated interval. The standard deviation calculating unit calculates a standard deviation of the detected acceleration values at every second stated interval. The walking mode analyzing unit determines a walking mode corresponding to the calculated standard deviation among first through $N^{th}$ walking modes as a walking pattern of the walker, in which N is a positive integer that is larger than 1. The acceleration comparing unit checks if there is at least one absolute value that is larger than a threshold acceleration value corresponding to the determined walking mode among the absolute values of the detected acceleration values. The step counting unit increments a count value as a step taken by the walker according to a result of the comparison of the acceleration comparing unit.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF THE INVENTION

Figure 1:
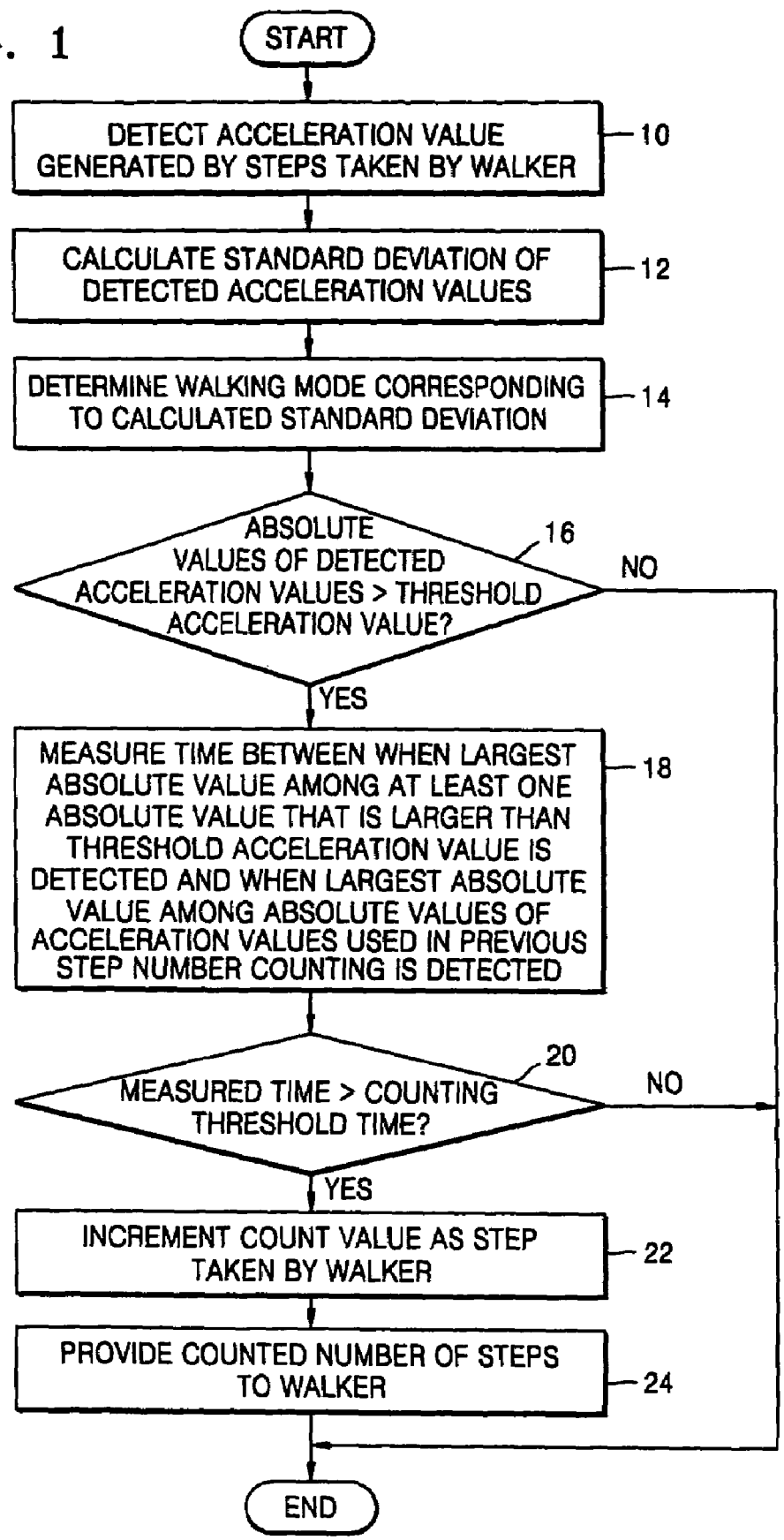
FIG. 1 is a flowchart illustrating a method for counting the number of steps taken by a walker according to an exemplary embodiment of the present invention.

FIG. 1 is a flowchart illustrating a method for counting the number of steps taken by a walker according to an embodiment of the present invention.

First, an acceleration value generated by a step taken by a walker is detected at every first stated interval in operation 10. For example, the first stated interval may be 1/80 (80 Hz) second. When the first stated interval is 1/80 second, the acceleration value is detected at every 1/80 second. The acceleration value is measured using a three-dimensional accelerometer.

In operation 12, a standard deviation of detected acceleration values is calculated at every second stated interval. The second stated interval is at least larger than the first stated interval. The standard deviation of detected acceleration values means the square root of the average (variance) of squared deviations from the mean of the detected acceleration values. The walking pattern of the walker can be detected using the calculated standard deviation. For example, when the walker runs rapidly, acceleration variance is large, which means a standard deviation of acceleration values is large too. In other words, a walker's running corresponds to a large standard deviation of acceleration values.

In operation 14, a walking mode corresponding to the calculated standard deviation is determined as the walking pattern of the walker among first through $N^{th}$ walking modes. Here, N is a positive integer that is larger than 1.

The walking pattern of the walker is classified into the first through $N^{th}$ walking modes. For example, the first walking mode indicates that a walking speed of the walker is lowest. The second walking mode indicates that a walking speed of the walker is higher than in the first walking mode. In this way, the third through $N^{th}$ walking modes are defined such that a walking speed of the walker increases as the degree of a walking mode increases.

If the calculated standard deviation is large, it means that a walking speed of the walker is high. Thus, a walking mode corresponding to a high walking speed is determined as the walking pattern of the walker. If the calculated standard deviation is small, it means that a walking speed of the walker is low. Thus, a walking mode corresponding to a low walking speed is determined as the walking pattern of the walker.

Table 1 shows examples of walking modes corresponding to standard deviations, where $g=9.8$ m/s$^2$.

TABLE 1

| Walking mode | Standard deviation ($\sigma$) range [g] | Threshold acceleration value [g] | Counting threshold time [s] |
|---|---|---|---|
| First walking mode | $\sigma < 0.09$ | 0.2 | 1.5 |
| Second walking mode | $0.09 \leq \sigma \leq 0.15$ | 0.2 | 1.5 |
| Third walking mode | $0.15 \leq \sigma \leq 0.25$ | 0.3 | 1 |
| Fourth walking mode | $0.25 \leq \sigma \leq 0.50$ | 0.5 | 0.5 |
| Fifth walking mode | $0.50 < \sigma$ | 0.7 | 0.2 |

As shown in Table 1, for example, when the calculated standard deviation is smaller than 0.09, it is determined that the subject walks slowly. Thus, the first walking mode is determined as the walking pattern of the walker. When the calculated standard deviation is larger than 0.50, it is determined that the walker runs rapidly. Thus, the fifth walking mode is determined as the walking pattern of the walker. When the calculated standard deviation is larger than 0.15 and smaller than 0.25, it is determined that the walker does not run but continues walking rapidly. Thus, the third walking mode is determined as the walking pattern of the walker.

In operation 16, it is determined whether at least one absolute value that is larger than a threshold acceleration value corresponding to the determined walking mode exists among the absolute values of the detected acceleration values. The threshold acceleration value is a predetermined threshold value corresponding to each walking mode and is a criterion for determining whether walker's movement can be counted as a step taken by the walker. In other words, it can be determined whether to increment a count value by checking if an acceleration value detected at every first stated interval exceeds the threshold acceleration value corresponding to the determined walking mode.

A threshold acceleration value corresponding to each walking mode is determined through repetitive experiments. The acceleration value that meets such a condition is determined as a threshold acceleration value corresponding to the walking mode.

As can be seen from Table 1, if the third walking mode is determined as the walking mode corresponding to the calculated standard deviation in operation 14, it is checked if an absolute value that is larger than a threshold acceleration value of 0.3 g corresponding to the third walking mode exists among the absolute values of the acceleration values detected in operation 10.

If at least one absolute value that is larger than the threshold acceleration value exists among the absolute values of the detected acceleration values, in operation 18, a time is measured between two events when the largest absolute value among the at least one absolute value that is larger than the threshold acceleration value is detected and when the largest absolute value among absolute values of acceleration values used in previous step number counting is detected. If at least one absolute value that is larger than the threshold acceleration value exists among the absolute values of the detected acceleration values, it means there is a high possibility of determining walker's movement as a step taken by the walker. Thus, at this time, a point when the largest absolute value among the absolute values of the measured acceleration values is detected and a point when the largest absolute value among the absolute values of acceleration values used in previous step number counting are checked and a time between the two points is measured.

In operation 20, it is determined whether the measured time exceeds a counting threshold time corresponding to the determined walking mode. The counting threshold time means a predetermined time corresponding to each walking mode and is a criterion for determining whether walker's movement can be counted as a step taken by the walker. When acceleration values generated by walker's movement other than walker's stepping exceed the counting threshold time within a short period of time after acceleration values used for step number counting are detected, counting may be mistakenly performed. The counting threshold time is used to prevent such mistaken counting. Thus, even when the absolute value of an acceleration value detected within a counting threshold time after detection of acceleration values used for step number counting exceeds a threshold acceleration value, a count value is not incremented as a step taken by the walker.

Referring to Table 1, if the third walking mode is determined as a walking mode corresponding to the calculated standard deviation in operation 14, it is checked if the measured time exceeds a counting threshold time of 1 second corresponding to the third walking mode in operation 18.

A counting threshold time corresponding to each walking mode is determined through repetitive experiments. Time that meets such a condition is determined as a counting threshold time corresponding to the walking mode.

If the measured time exceeds the determined counting threshold time, a count value is incremented in operation 22. An excess of the measured time over the determined counting threshold time means walker's movement causing the detected acceleration value may be determined as walker's stepping. Thus, if the measured time exceeds the determined counting threshold time, a count value is incremented.

In operation 24, the counted number of steps is provided to the walker by, in particular, displaying the counted number of outputting the counted number through a voice.

Hereinafter, an apparatus for counting the number of steps taken by a walker according to an embodiment of the present invention will be described with reference to FIG. 2.

Figure 2:
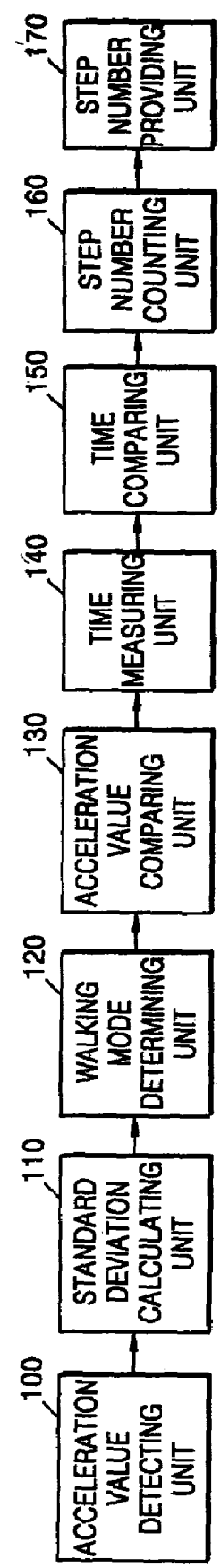
FIG. 2 is a block diagram of an apparatus for counting the number of steps taken by a walker according to an exemplary embodiment of the present invention.

FIG. 2 is a block diagram of an apparatus for counting the number of steps taken by a walker according to an embodiment of the present invention. The apparatus includes an acceleration detecting unit 100, a standard deviation calculating unit 110, a walking mode analyzing unit 120, an acceleration comparing unit 130, a time measuring unit 140, a time comparing unit 150, a step counting unit 160, and a step output unit 170.

The acceleration detecting unit 100 detects an acceleration value generated by a step taken by a walker at every first stated interval and outputs a result of the detection to the standard deviation calculating unit 110. The acceleration detecting unit 100 detects acceleration values generated by steps taken by the walker using a three-dimensional acceleration sensor. The three-dimensional acceleration sensor detects an acceleration value generated by walker's movement by putting forward or backward advancing of the walker on an X-axis, vertical movement of the walker on a Y-axis, and horizontal movement of the walker on a Z-axis.

In particular, the three-dimensional acceleration sensor detects an acceleration value generated by vertical movement of the walker and uses the detected acceleration value as main information for step number counting.

The standard deviation calculating unit 110 calculates a standard deviation of acceleration values detected by the acceleration detecting unit 100 at every second stated interval and outputs a result of the detection to the walking mode analyzing unit 120. The standard deviation calculating unit 110 calculates the average of squared deviations from the mean of the detected acceleration values and then calculates the square root of the average, thereby calculating the standard deviation of detected acceleration values.

The walking mode analyzing unit 120 determines a walking mode corresponding to the calculated standard deviation among the first through $N^{th}$ walking modes as the walking pattern of the walker and outputs the determined walking mode to the acceleration comparing unit 130. Here, N is a positive integer that is larger than 1.

Table 1 shows examples of walking modes corresponding to standard deviations. Information in the form of a lookup table that stores walking modes corresponding to standard deviations is stored in a predetermined storage space of the apparatus for counting the number of steps.

The walking mode analyzing unit 120 determines a walking mode corresponding to the standard deviation computed by the standard deviation calculating unit 110 based on information about walking modes corresponding to standard deviations stored in the predetermined storage space. If the calculated standard deviation is large, it means that a walking speed of the walker is high. Thus, the walking mode analyzing unit 120 determines a walking mode corresponding to a high walking speed. If the calculated standard deviation is small, it means that a walking speed of the walker is low. Thus, the walking mode analyzing unit 120 determines a walking mode corresponding to a low walking speed.

The acceleration comparing unit 130 checks if at least one absolute value that is larger than a threshold acceleration value corresponding to the determined walking mode exists among the absolute values of the detected acceleration values, and then outputs a result of the checking to the time measuring unit 140.

Table 1 also shows examples of threshold acceleration values corresponding to walking modes. Information in the form of a lookup table that stores threshold acceleration values corresponding to walking modes is stored in a predetermined storage space of the apparatus for counting the number of steps.

For example, if the walking mode analyzing unit 120 determines the third walking mode as a walking mode corresponding to the calculated standard deviation, the acceleration comparing unit 130 checks if an absolute value that is larger than a threshold acceleration value of 0.3 g corresponding to the third walking mode exists among the absolute values of the detected acceleration values.

According to a result of the comparison of the acceleration comparing unit 130, the time measuring unit 140 measures a time between when the largest absolute value among the at least one absolute value that is larger than the threshold acceleration value is detected and when the largest absolute value among absolute values of acceleration values used in previous step number counting is detected. The time measuring unit 140 then outputs a result of the measurement to the time comparing unit 150.

If a result of the checking indicates that at least one absolute value that is larger than a threshold acceleration value corresponding to the walking mode determined by the walking mode analyzing unit 130 exists among the absolute values of the acceleration values detected by the acceleration value detecting unit 100, the time measuring unit 140 measures a time between when the largest absolute value among the at least one absolute value that is larger than the threshold acceleration value is detected and when the largest absolute value among absolute values of acceleration values used in previous step number counting is detected.

According to a result of the measurement, the time comparing unit 150 checks if the measured time exceeds a counting threshold time corresponding to the determined walking mode and outputs a result of the checking to the step counting unit 160. For example, if the walking mode analyzing unit 120 determines the third walking mode as a mode corresponding to the calculated standard deviation, the time comparing unit 150 checks if the time measured by the time measuring unit 140 exceeds a counting threshold time of one second corresponding to the third walking mode.

To check if the measured time exceeds a counting threshold time corresponding to the determined walking mode, the time comparing unit 150 uses counting threshold times determined through repetitive experiments.

According to a result of the comparison of the time comparing unit 150, the step counting unit 160 counts the number of steps taken by the walker and outputs the counted number to the step output unit 170.

The step output unit 170 provides the number of steps counted by the step counting unit 160 to the walker.

The step output unit 170 provides the counted number of steps to the walker by displaying the counted number. To display the counted number of steps, the step output unit 170 includes a liquid crystal display (LCD) device.

In addition, the step output unit 170 may provide the counted number of steps to the walker by outputting the counted number through a voice. To this end, the step output unit 170 includes a voice output device.

As described above, according to the present invention, it is possible to more accurately counting the number of steps taken by a walker by performing counting according to the walking pattern of the walker. In other words, it is possible to minimize an error in step number counting that may occur due to walking pattern variance such as walking or running.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method for counting the number of steps taken by a walker, the method comprising:
    detecting an acceleration value generated by a step taken by the walker at every first stated interval;
    calculating a standard deviation at every second stated interval for detected acceleration values;
    determining a walking mode corresponding to the calculated standard deviation among first through $N^{th}$ walking modes as a walking pattern of the walker, in which N is a positive integer that is larger than 1;
    checking if there is at least one absolute value that is larger than a threshold acceleration value corresponding to the determined walking mode among the absolute values of the detected acceleration values;
    incrementing a count value as a step taken by the walker if there is at least one absolute value that is larger than the threshold acceleration value among the absolute values of the detected acceleration values; and
    providing the counted number of steps to the walker after incrementing a count value as a step taken by the walker.

2. The method of claim 1, further comprising:
    measuring a time between when at least one largest absolute value among the absolute values that are larger than the threshold acceleration value is detected and when the largest absolute value among the absolute values of acceleration values used for previous step number counting is detected, if there is at least one absolute value that is larger than the threshold acceleration value corresponding to the determined walking mode among the absolute values of the detected acceleration values; and
    checking if the measured time exceeds a counting threshold time corresponding to the determined walking mode;
    wherein a count value is incremented as a step taken by the walker if the measured time exceeds the counting threshold time.

3. The method of claim 2, wherein the counting threshold time is determined through repetitive experiments.

4. The method of claim 1, wherein the walker is provided with the counted number of steps that is displayed.

5. The method of claim 1, wherein the walker is provided with the counted number of steps that is output through a voice.

6. The method of claim 1, wherein the threshold acceleration value is determined through repetitive experiments.

7. An apparatus for counting the number of steps taken by a walker, the apparatus comprising:
    an acceleration detecting unit which detects an acceleration value generated by a step taken by the walker at every first stated interval;
    a standard deviation calculating unit which calculates a standard deviation at every second stated interval for detected acceleration values;
    a walking mode analyzing unit which determines a walking mode corresponding to the calculated standard deviation among first through $N^{th}$ walking modes as a walking pattern of the walker, in which N is a positive integer that is larger than 1;
    an acceleration value comparing unit which checks if there is at least one absolute value that is larger than a threshold acceleration value corresponding to the determined walking mode among the absolute values of the detected acceleration values;
    a step counting unit which increments a count value as a step taken by the walker according to a result of the comparison of the acceleration value comparing unit; and
    a step output unit which provides the counted number of steps to the walker after incrementing a count value as a step taken by the walker.

8. The apparatus of claim 7, further comprising:
    a time measuring unit which measures a time between when there is at least one largest absolute value among the absolute values that are larger than the threshold acceleration value is detected and when the largest absolute value among the absolute values of acceleration values used for previous step number counting is detected, according to a result of the comparison of the acceleration value comparing unit; and
    a time comparing unit which checks if the measured time exceeds a counting threshold time corresponding to the determined walking mode according to a result of the measurement of the time measuring unit;

wherein the step counting unit operates according to the result of the comparison of the acceleration value comparing unit.

9. The apparatus of claim 8, wherein the time comparing unit uses the counting threshold time determined through repetitive experiments to check if the measured time exceeds a counting threshold time corresponding to the determined walking mode.

10. The apparatus of claim 7, wherein the step output unit provides the counted number of steps to the walker by displaying the counted number of steps.

11. The apparatus of claim 10, wherein the step output unit includes a liquid crystal display (LCD) device.

12. The apparatus of claim 7, wherein the step output unit provides the counted number of steps to the walker by outputting the counted number of steps through a voice.

13. The apparatus of claim 7, wherein the acceleration detecting unit detects acceleration values generated by steps taken by the walker using a three-dimensional acceleration sensor.

14. The apparatus of claim 7, wherein the acceleration comparing unit uses the threshold acceleration value determined through repetitive experiments to check if there is at least one absolute value that is larger than the threshold acceleration value among the absolute values of the detected acceleration values.

* * * * *